United States Patent
Kavali et al.

(10) Patent No.: US 11,789,779 B2
(45) Date of Patent: Oct. 17, 2023

(54) ELECTRONIC SYSTEM FOR MONITORING AND AUTOMATICALLY CONTROLLING BATCH PROCESSING

(71) Applicant: BANK OF AMERICA CORPORATION, Charlotte, NC (US)

(72) Inventors: Rama Venkata S. Kavali, Frisco, TX (US); Lawrence D'silva, Maharashtra (IN); Venugopala Rao Randhi, Telangana (IN); Damodarrao Thakkalapelli, Agoura Hills, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 477 days.

(21) Appl. No.: 17/188,901

(22) Filed: Mar. 1, 2021

(65) Prior Publication Data

US 2022/0276900 A1 Sep. 1, 2022

(51) Int. Cl.
G06F 9/50 (2006.01)
G06F 9/48 (2006.01)
G06N 20/00 (2019.01)
G06N 5/04 (2023.01)

(52) U.S. Cl.
CPC .......... *G06F 9/5038* (2013.01); *G06F 9/4887* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,774,457 | B1 * | 8/2010 | Talwar | G06F 9/5072 709/224 |
| 8,024,733 | B2 * | 9/2011 | Hambrick | G06F 9/485 718/101 |
| 8,584,122 | B2 * | 11/2013 | Ferrandiz | G06F 9/466 718/101 |
| 8,713,579 | B2 * | 4/2014 | Cardelli | G06F 9/4887 718/106 |
| 8,875,150 | B2 | 10/2014 | Ferdous et al. | |
| 9,319,281 | B2 * | 4/2016 | Yotsutani | H04L 9/40 |
| 10,025,659 | B2 | 7/2018 | Shinde et al. | |
| 10,275,176 | B1 * | 4/2019 | Gold | G06F 16/245 |
| 10,642,801 | B2 * | 5/2020 | Pulaski | G06F 9/4887 |
| 10,705,877 | B2 * | 7/2020 | Wolfson | G06F 9/5038 |
| 10,853,147 | B2 * | 12/2020 | Yeung | G06F 11/3414 |

(Continued)

*Primary Examiner* — Van H Nguyen
(74) *Attorney, Agent, or Firm* — Moore & Van Allen PLLC; R. W. McCord Rayburn

(57) ABSTRACT

Systems, computer program products, and methods are described herein for monitoring and automatically controlling batch processing. The present invention may be configured to receive a plurality of data processing requests and determine a processing plan for the plurality of data processing requests. The present invention may be configured to provide, to processing applications and based on the processing plan, actions for performance by the processing applications to complete the plurality of data processing requests. The present invention may be configured to predict, while the processing applications are performing the actions and using a completion time predicting machine learning model, completion times for the plurality of data processing requests.

20 Claims, 3 Drawing Sheets

(56) References Cited

U.S. PATENT DOCUMENTS

| | | | |
|---|---|---|---|
| 11,009,836 B2* | 5/2021 | Hoffmann | G05B 13/0265 |
| 11,455,168 B1* | 9/2022 | Potyraj | G06F 9/3005 |
| 11,521,162 B2* | 12/2022 | Scot | G06N 20/00 |
| 2005/0198636 A1* | 9/2005 | Barsness | G06F 11/3452 |
| | | | 718/100 |
| 2007/0168874 A1 | 7/2007 | Kloeffer et al. | |
| 2020/0226037 A1 | 7/2020 | Pope et al. | |
| 2020/0258057 A1 | 8/2020 | Farahat et al. | |
| 2021/0042168 A1 | 2/2021 | Bakulin et al. | |

* cited by examiner

ELECTRONIC SYSTEM FOR MONITORING AND AUTOMATICALLY CONTROLLING BATCH PROCESSING

FIELD OF THE INVENTION

The present invention embraces an electronic system for monitoring and automatically controlling batch processing.

BACKGROUND

Batch processing is a method of performing a large number of data processing requests (e.g., jobs) that typically require little or no user interaction to complete. Batch processing is typically performed at a time based on a schedule or calendar (e.g., when computing resources are available to complete the data processing requests). Teams of support users manually monitor one or more applications at a time while the applications perform the batch processing and react to any issues that occur.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for monitoring and automatically controlling batch processing is presented. The system may include at least one non-transitory storage device and at least one processing device coupled to the at least one non-transitory storage device, where the at least one processing device is configured to receive a plurality of data processing requests and, for each data processing request, a calendar for the data processing request, one or more tasks to be completed for the data processing request, and requirements for the data processing request, determine a processing plan for the plurality of data processing requests, where the processing plan includes an order for performing the plurality of data processing requests and computing resources to be used to perform the plurality of data processing requests, provide, to one or more processing applications and based on the processing plan, actions for performance by the one or more processing applications to complete the plurality of data processing requests, predict, while the one or more processing applications are performing the actions, based on historical performances of data processing requests, and using a completion time predicting machine learning model, completion times for the plurality of data processing requests, determine, while the one or more processing applications are performing the actions, whether the completion times satisfy the requirements for the plurality of data processing requests, and allocate, based on the completion times not satisfying the requirements for the plurality of data processing requests, additional computing resources to the one or more processing applications.

In some embodiments, the at least one processing device is further configured to determine, based on active runtime data of the one or more processing applications and server state data, a pace of the plurality of data processing requests.

In some embodiments, the at least one processing device is further configured to, when determining the pace of the plurality of data processing requests, determine the pace of the plurality of data processing requests using a pace prediction machine learning model and based on the active runtime data of the one or more processing applications, the server state data, interdependencies of the plurality of data processing requests, and historical performances of data processing requests.

In some embodiments, the at least one processing device is further configured to, while the one or more processing applications are performing the actions, monitor the pace of the plurality of data processing requests to determine whether the pace of the plurality of data processing requests decreases, predict, based on determining that the pace of the plurality of data processing requests is decreasing and using the completion time predicting machine learning model, updated completion times for the plurality of data processing requests, determine whether the updated completion times satisfy the requirements for the plurality of data processing requests, and allocate, based on the updated completion times not satisfying the requirements for the plurality of data processing requests, supplementary computing resources to the one or more processing applications.

In some embodiments, the at least one processing device is further configured to, when predicting the completion times, predict the completion times based on active runtime data of the one or more processing applications.

In some embodiments, the at least one processing device is further configured to, when predicting the completion times, determine, based on dependency rules, interdependencies of the plurality of data processing requests and predict the completion times based on the interdependencies.

In some embodiments, the at least one processing device is further configured to provide the actions to complete the plurality of data processing requests to the one or more processing applications via an application programming interface.

In another aspect, a computer program product for monitoring and automatically controlling batch processing is presented. The computer program product may include a non-transitory computer-readable medium including code causing a first apparatus to receive a plurality of data processing requests and, for each data processing request, a calendar for the data processing request, one or more tasks to be completed for the data processing request, and requirements for the data processing request, determine a processing plan for the plurality of data processing requests, where the processing plan includes an order for performing the plurality of data processing requests and computing resources to be used to perform the plurality of data processing requests, provide, to one or more processing applications and based on the processing plan, actions for performance by the one or more processing applications to complete the plurality of data processing requests, predict, while the one or more processing applications are performing the actions, based on historical performances of data processing requests, and using a completion time predicting machine learning model, completion times for the plurality of data processing requests, determine, while the one or more processing applications are performing the actions, whether the completion times satisfy the requirements for the plurality of data processing requests, and allocate, based on the completion times not satisfying the requirements for the plurality of data processing requests, additional computing resources to the one or more processing applications.

In some embodiments, the non-transitory computer-readable medium may include code causing the first apparatus to determine, based on active runtime data of the one or more processing applications and server state data, a pace of the plurality of data processing requests.

In some embodiments, the non-transitory computer-readable medium may include code causing the first apparatus to, when determining the pace of the plurality of data processing requests, determine the pace of the plurality of data processing requests using a pace prediction machine learning model and based on the active runtime data of the one or more processing applications, the server state data, interdependencies of the plurality of data processing requests, and historical performances of data processing requests.

In some embodiments, the non-transitory computer-readable medium may include code causing the first apparatus to, while the one or more processing applications are performing the actions, monitor the pace of the plurality of data processing requests to determine whether the pace of the plurality of data processing requests decreases, predict, based on determining that the pace of the plurality of data processing requests is decreasing and using the completion time predicting machine learning model, updated completion times for the plurality of data processing requests, determine whether the updated completion times satisfy the requirements for the plurality of data processing requests, and allocate, based on the updated completion times not satisfying the requirements for the plurality of data processing requests, supplementary computing resources to the one or more processing applications.

In some embodiments, the non-transitory computer-readable medium may include code causing the first apparatus to, when predicting the completion times, predict the completion times based on active runtime data of the one or more processing applications.

In some embodiments, the non-transitory computer-readable medium may include code causing the first apparatus to, when predicting the completion times, determine, based on dependency rules, interdependencies of the plurality of data processing requests and predict the completion times based on the interdependencies.

In some embodiments, the non-transitory computer-readable medium may include code causing the first apparatus to provide the actions to complete the plurality of data processing requests to the one or more processing applications via an application programming interface.

In yet another aspect, a method for monitoring and automatically controlling batch processing is presented. The method may include receiving a plurality of data processing requests and, for each data processing request, a calendar for the data processing request, one or more tasks to be completed for the data processing request, and requirements for the data processing request, determining a processing plan for the plurality of data processing requests, where the processing plan includes an order for performing the plurality of data processing requests and computing resources to be used to perform the plurality of data processing requests, providing, to one or more processing applications and based on the processing plan, actions for performance by the one or more processing applications to complete the plurality of data processing requests, predicting, while the one or more processing applications are performing the actions, based on historical performances of data processing requests, and using a completion time predicting machine learning model, completion times for the plurality of data processing requests, determining, while the one or more processing applications are performing the actions, whether the completion times satisfy the requirements for the plurality of data processing requests, allocating, based on the completion times not satisfying the requirements for the plurality of data processing requests, additional computing resources to the one or more processing applications, determining, while the one or more processing applications are performing the actions, a state of the plurality of data processing requests, determining, based on the state of the plurality of data processing requests corresponding to an error state and using an event state decision machine learning model, one or more remedial actions to resolve the error state, and providing instructions to the one or more processing applications to perform the one or more remedial actions.

In some embodiments, the method may include determining, based on active runtime data of the one or more processing applications and server state data, a pace of the plurality of data processing requests.

In some embodiments, the method may include, when determining the pace of the plurality of data processing requests, determining the pace of the plurality of data processing requests using a pace prediction machine learning model and based on the active runtime data of the one or more processing applications, the server state data, interdependencies of the plurality of data processing requests, and historical performances of data processing requests.

In some embodiments, the method may include, while the one or more processing applications are performing the actions, monitoring the pace of the plurality of data processing requests to determine whether the pace of the plurality of data processing requests decreases, predicting, based on determining that the pace of the plurality of data processing requests is decreasing and using the completion time predicting machine learning model, updated completion times for the plurality of data processing requests, determining whether the updated completion times satisfy the requirements for the plurality of data processing requests, and allocating, based on the updated completion times not satisfying the requirements for the plurality of data processing requests, supplementary computing resources to the one or more processing applications.

In some embodiments, the method may include, when predicting the completion times, predicting the completion times based on active runtime data of the one or more processing applications.

In some embodiments, the method may include, when predicting the completion times, determining, based on dependency rules, interdependencies of the plurality of data processing requests and predicting the completion times based on the interdependencies.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
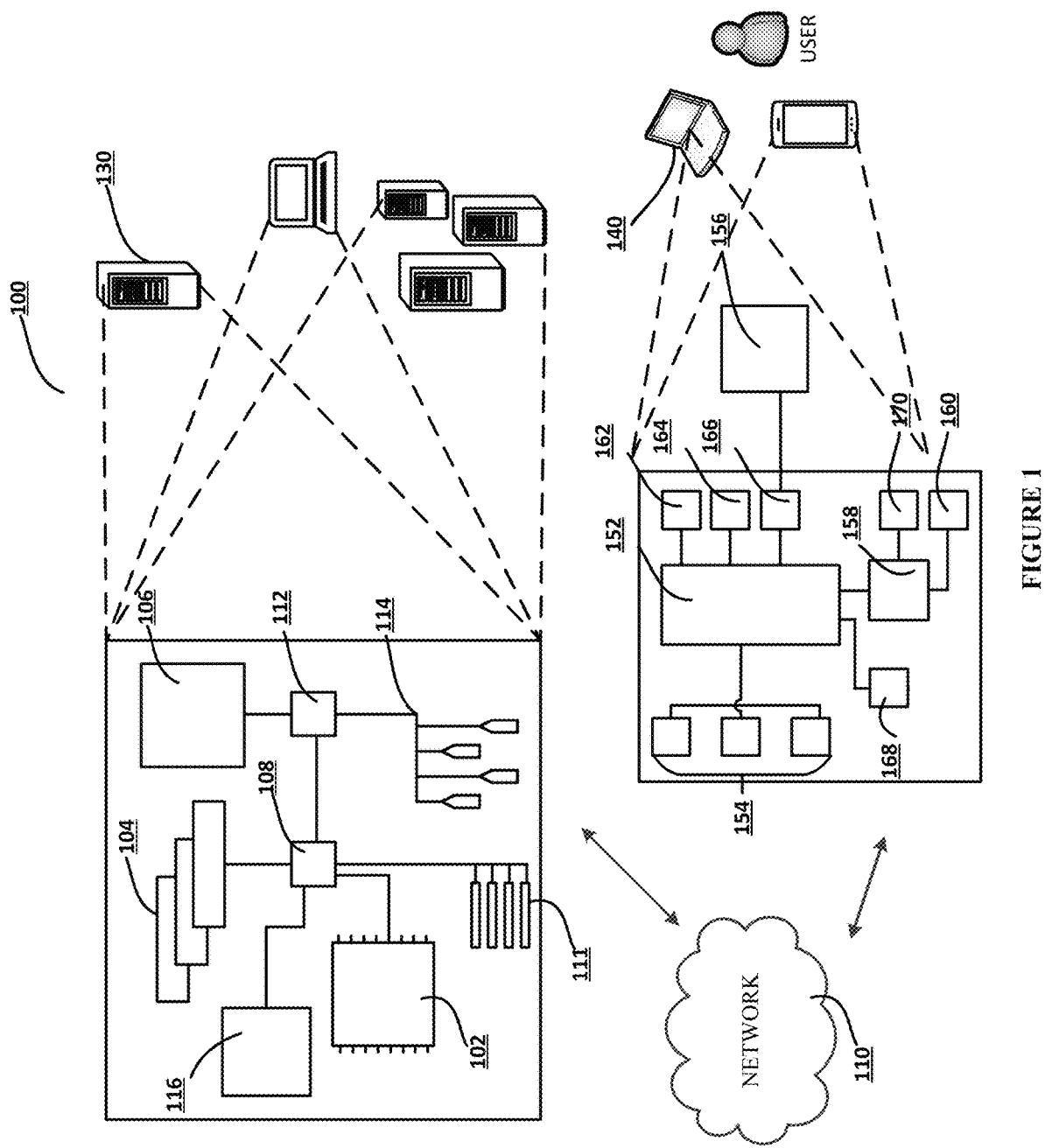
Figure 2:
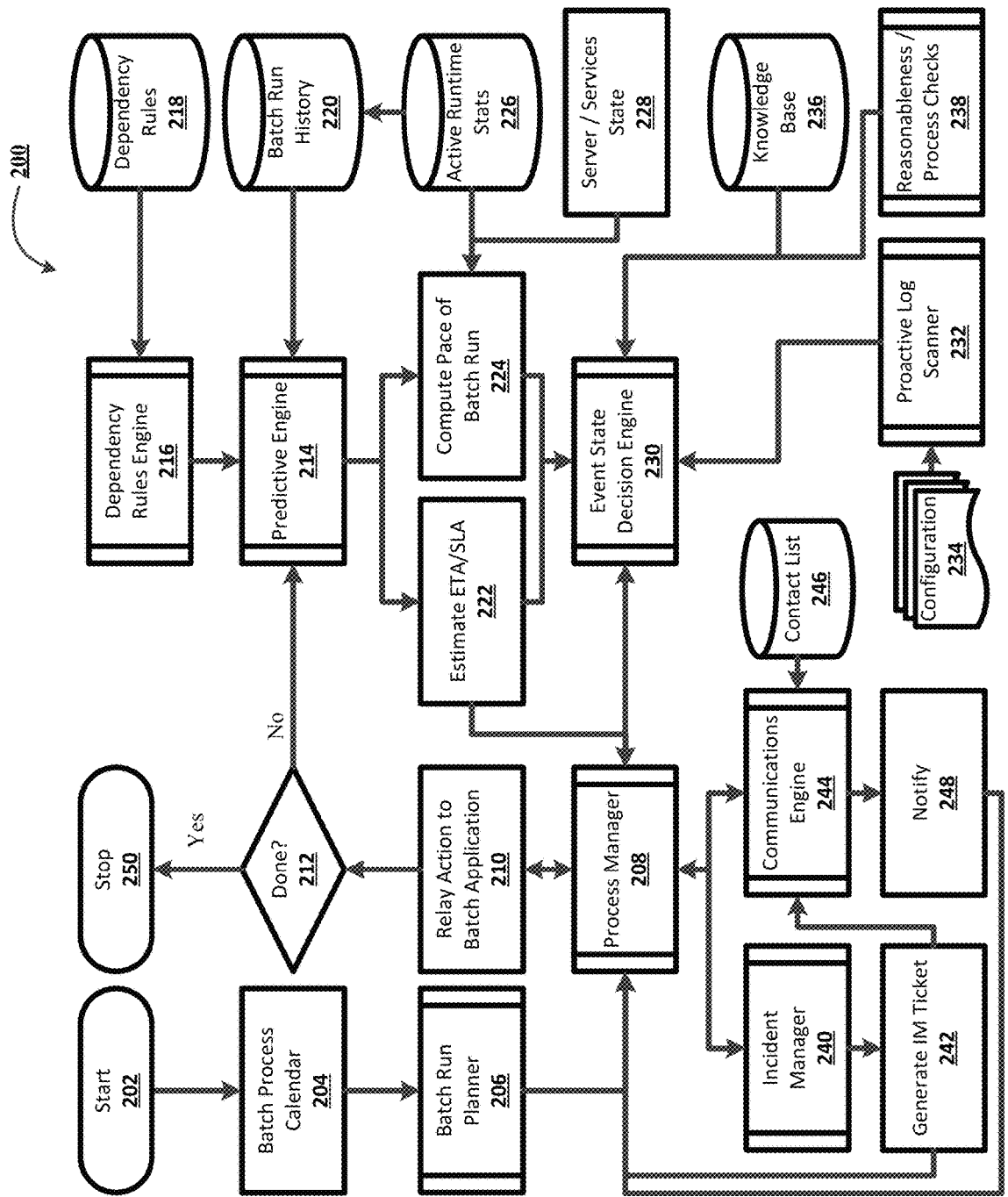
Figure 3:
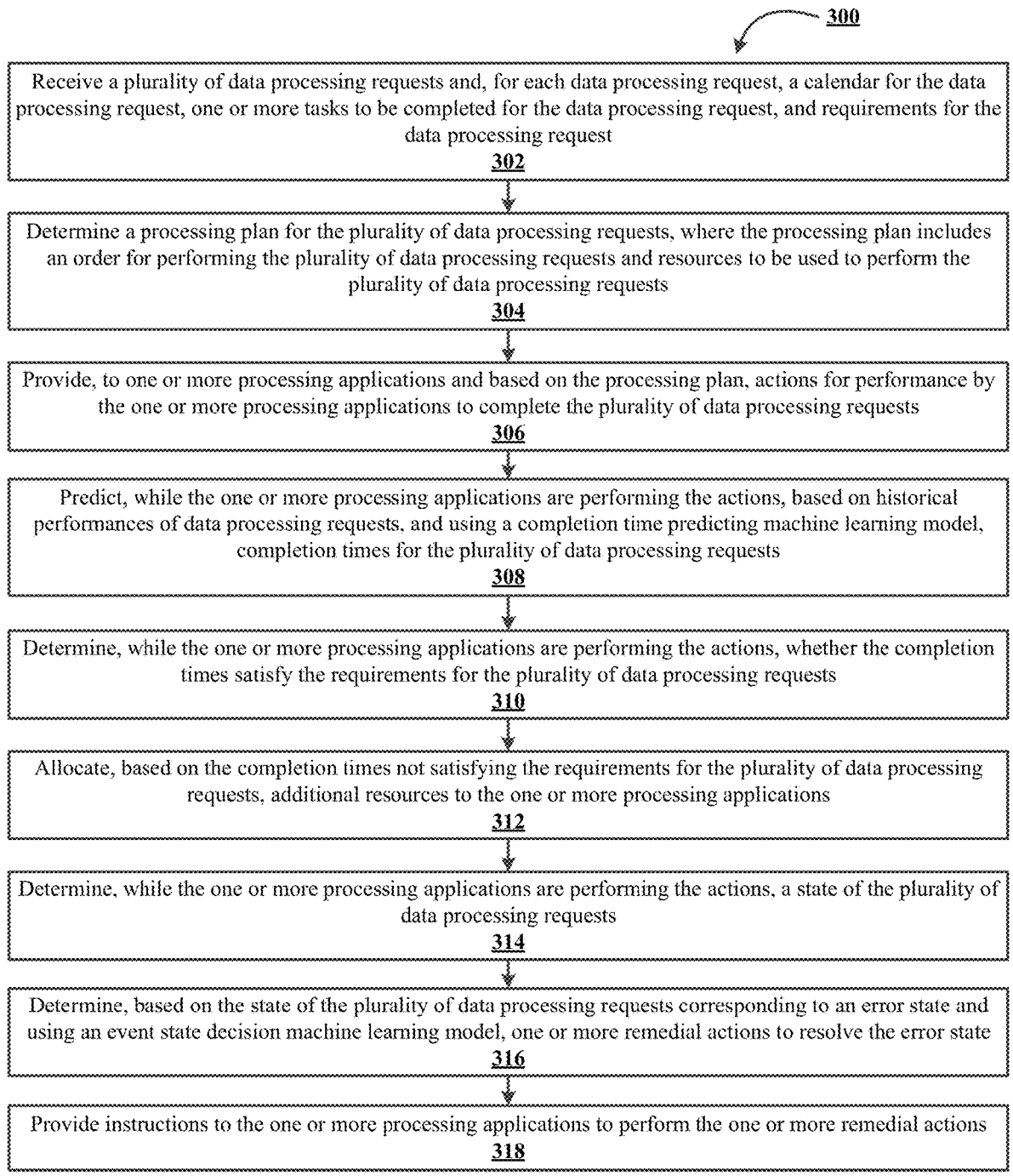

Having thus described embodiments of the invention in general terms, reference will now be made the accompanying drawings, wherein:

FIG. 1 illustrates technical components of a system for monitoring and automatically controlling batch processing, in accordance with an embodiment of the invention;

FIG. 2 illustrates a process flow for monitoring and automatically controlling batch processing, in accordance with an embodiment of the invention; and FIG. 3 illustrates a process flow for monitoring and automatically controlling batch processing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like.

As used herein, a "user interface" may be any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like. As used herein, a "computing resource" may generally refer to processing resources, memory resources, power resources, communication resources, network resources, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally-controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As noted, batch processing is a method of performing a large number of data processing requests (e.g., jobs) that typically require little or no user interaction to complete. Batch processing is typically performed at a time based on a schedule or calendar (e.g., when computing resources are available to complete the data processing requests). Teams of support users manually monitor one or more applications at a time while the applications perform the batch processing and react to any issues that occur. However, manually monitoring applications performing batch processing consumes significant resources (e.g., financial resources, computing resources, network resources, and/or the like), may be prone to human error, and requires substantial human effort.

Some embodiments described herein provide a system, a computer program product, and/or a method for monitoring and automatically controlling batch processing. For example, a system (e.g., an electronic system for monitoring and automatically controlling batch processing and/or the like) may use machine learning in a systematic way to build a framework to monitor end-to-end batch process systems that learns, heals, and improves itself. In some embodiments, the system may be an artificial intelligence (AI) system and/or a machine learning system configured to learn the structure, schedules, paces of run, errors, fixes, and/or the like of batch processes as it monitors the batch processes. By using AI and/or machine learning to monitor and learn, the system may become more efficient over time.

Additionally, or alternatively, the system may be generic (e.g., not specific to a particular type and/or types of applications, services, data structures, and/or the like performing the batch processing) and may monitor multiple batch processes (e.g., multiple heterogeneous batch processes and/or the like) at the same time. In some embodiments, the system may react and take action to correct an incident (e.g., an error in batch processing and/or the like) in less time as compared to a reaction time when manual monitoring is performed.

In this way, the system may minimize and/or eliminate manual batch process monitoring, which conserves resources (e.g., financial resources, computing resources, network resources, and/or the like) that would otherwise be consumed by manual monitoring. Furthermore, the system may minimize and/or eliminate human-driven errors, which further conserves resources (e.g., financial resources, computing resources, network resources, and/or the like). Additionally, or alternatively, the system may minimize and/or eliminate the need for complex schedules of global teams of support users in multiple time zones to monitor system, which further conserves resources (e.g., financial resources, computing resources, network resources, and/or the like). By using AI and/or machine learning to monitor and learn, the system may be more reliable, more stable, and/or more scalable than manual monitoring of batch processing, which further conserves resources (e.g., financial resources, computing resources, network resources, and/or the like)

FIG. 1 presents an exemplary block diagram of a system environment 100 for monitoring and automatically controlling batch processing within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, analyze the results of, and/or the like batch processing by one or more applications (e.g., stored thereon). The one or more applications may be configured to communicate with the system 130, execute batch processing, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for monitoring and automatically controlling batch processing, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a batch processing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include one or more user input systems and/or one or more batch process monitoring systems (e.g., similar to the system 130 and/or the user input system 140) associated with an entity (e.g., a business, a merchant, a financial institution, a card management institution, an software and/or hardware development company, a batch process monitoring company, and/or the like). For example, a user (e.g., an employee, a customer, and/or the like) may use a user input system (e.g., similar to the user input system 140) to monitor batch processing by one or more other applications (e.g., on one or more other systems similar to the system 130). In some embodiments, the user input system and/or the batch process monitoring system associated with the entity may perform one or more of the steps described herein with respect to the process flow described herein with respect to FIGS. 2 and/or 3.

FIG. 2 illustrates a process flow 200 for monitoring and automatically controlling batch processing within a technical environment, in accordance with an embodiment of the invention. In some embodiments, a batch process monitoring system and/or the like (e.g., similar to one or more of the systems described herein with respect to FIG. 1) may perform one or more of the steps of process flow 200.

As shown in FIG. 2, the process flow 200 may include a start block 202 to initiate the process flow 200. In some embodiments, the start block 202 may include receiving a request to perform batch processing (e.g., data processing requests, batch runs, jobs, and/or the like). For example, a batch process monitoring system may begin the process flow 200 based on receiving a request to perform batch processing. In some embodiments, the request to perform batch processing may include a request to perform batch processing on data associated with resource distributions, originations of loans (e.g., mortgages, personal loans, equity loans, credit cards, and/or the like), distributions with respect to loans, and/or the like.

As shown in FIG. 2, the process flow 200 may include generating a batch process calendar 204. In some embodiments, the batch process calendar 204 may be generated based on a batch processing request, a Service Level Agreement (SLA), and/or the like. For example, a batch process monitoring system may generate the batch process calendar 204 based on information associated with a batch processing request, an SLA, and/or the like, such as when a batch process is to be run (e.g., on weekends, on holidays, on a particular day of the week, and/or the like), how often a batch process is to be run (e.g., hourly, daily, weekly, monthly, yearly, and/or the like), how long the batch process should be performed (e.g., for a day, for a week, for a month, for a year, indefinitely, and/or the like), and/or the like.

As shown in FIG. 2, the process flow 200 may include providing the batch process calendar 204 to a batch run planner 206. In some embodiments, the batch run planner 206 may receive the batch process calendar 204, tasks to be performed in one or more batch runs, one or more SLAs, and/or the like. Additionally, or alternatively, the batch run planner 206 may generate, based on the batch process calendar 204, the tasks to be performed in one or more batch runs, the one or more SLAs, and/or the like, a batch run plan including information regarding how to run the batch processes, resources (e.g., computing resources, network resources, and/or the like) to use when running the batch processes, and/or the like.

As show in FIG. 2, the process flow 200 may include providing the batch run plan to a process manager 208. In some embodiments, the process manager 208 may receive the batch run plan and orchestrate events, services, resources, and/or the like to complete the batch processes. Additionally, or alternatively, the process manager 208 may include a program manager service and/or the like.

As shown in FIG. 2, the process flow 200 may include the process manager 208 relaying an action to a batch application 210. For example, the process manager 208 may provide, to one or more processing applications and based on the processing plan, instructions, actions, commands, and/or the like for performance by the one or more processing applications to complete the batch processing. In some embodiments, the process manager 208 may generate and provide a command causing the one or more processing applications to perform actions to initiate, carry out, complete, and/or the like the batch processing.

As shown in FIG. 2, the process flow 200 may include determining whether the batch processing is done 212. For example, a batch process monitoring system may determine whether batch processing is done. In some embodiments, the batch process monitoring system may receive status information from one or more processing applications performing the batch processing and determine whether batch processing is done based on the status information. Additionally, or alternatively, the batch process monitoring system may determine whether batch processing is done using and/or based on information from an event state decision engine 230 described further herein.

In some embodiments, the process flow 200 may include receiving, from a user, another system, and/or the like, a request (e.g., a manual request and/or the like) to stop the batch processing and stopping, based on receiving the request, the batch processing. For example, a support user monitoring the batch processing may provide, to the batch process monitoring system, a request to stop the batch processing, and the batch process monitoring system may stop, based on the request, the batch processing (e.g., by instructing one or more processing applications performing the batch processing to stop in a manner similar to that described herein with respect to the process manager 208 relaying an action to a batch application 210).

As shown in FIG. 2, the process flow 200 may include, based on determining that the batch processing is not done, using a predictive engine 214. In some embodiments, and as shown in FIG. 2, the predictive engine 214 may receive information from a dependency rules engine 216. Additionally, or alternatively, the process flow 200 may include determining, using the dependency rules engine 216 and based on dependency rules stored in a dependency rules data structure 218, interdependencies of tasks, actions, jobs, processes, and/or the like of the batch processing. For example, the dependency rules engine 216 may determine, based on the dependency rules, which tasks, actions, jobs, processes, and/or the like of the batch processing are dependent on other tasks, actions, jobs, processes, and/or the like and/or whether some tasks, actions, jobs, processes, and/or the like are to be performed before other tasks, actions, jobs, processes, and/or the like.

As shown in FIG. 2, the process flow 200 may include determining, using the predictive engine 214, an estimated ETA as compared to the SLA 222 and a pace of the batch run 224. In some embodiments, and as shown in FIG. 2, the predictive engine 214 may estimate an estimated time of arrival (ETA) as compared to the SLA 222 based on the interdependencies provided by the dependency rules engine 216 and based on batch run history data stored in a batch run history data structure 220. For example, the predictive engine 214 may provide the interdependencies and/or the batch run history data to a completion time predicting machine learning model to estimate the ETA and compare the ETA to the SLA.

As shown in FIG. 2, the process flow 200 may include providing the estimate of the ETA as compared to the SLA to the process manager 208. In some embodiments, based on the estimate of the ETA not complying with the SLA, the process manager 208 may allocate additional computing resources to the batch processing. For example, the process manager 208 may allocate additional computing resources to one or more applications performing the batch processing such that the one or more applications may perform the batch processing in less time.

In some embodiments, the process flow 200 may include determining (e.g., with the process manager 208) that allocating additional computing resources to the batch processing and/or performing one or more other actions to accelerate the batch processing will not result in the estimate of the ETA complying with the SLA. Additionally, or alternatively, the process flow 200 may include providing, to a support user and based on determining that allocating additional computing resources to the batch processing and/or performing one or more other actions to accelerate the batch processing will not result in the estimate of the ETA complying with the SLA, a notification including information indicating that a potential breach of the SLA exists.

As shown in FIG. 2, the process flow 200 may include determining and/or computing, using the predictive engine 214, a pace of the batch run 224. In some embodiments, the predictive engine 214 may determine the pace of the batch run 224 based on the interdependencies provided by the dependency rules engine 216, based on batch run history data stored in a batch run history data structure 220, based on active runtime statistics data stored in an active runtime statistics data structure 226, and based on server and/or services state data stored in a server and/or services state data structure 228. For example, the predictive engine 214 may provide the interdependencies, the batch run history data, the active runtime statistics data, and/or the server and/or services state data to a pace prediction machine learning model to determine the pace of the batch run 224.

As shown in FIG. 2, the process flow 200 may include storing the active runtime statistics data in the batch run history data structure 220. For example, while batch processing is performed, the process flow 200 may include collecting the active runtime statistics data and storing the active runtime statistics data in the active runtime statistics data structure 226. Additionally, or alternatively, the process flow 200 may include, while and/or after batch processing is performed, storing the active runtime statistics data in the batch run history data structure 220. In this way, the completion time predicting machine learning model and/or the pace prediction machine learning model may be continuously provided with new data to improve predictions as additional batch processing is performed.

As shown in FIG. 2, the process flow 200 may include providing the ETA 222 and the pace of the batch run 224 to an event state decision engine 230. In some embodiments, the process flow 200 may include determining (e.g., using the event state decision engine 230) an event state of the batch processing. For example, and as shown in FIG. 2, the process flow 200 may include scanning a log of events occurring during the batch processing using a proactive log scanner 232. In some embodiments, the proactive log scanner 232 may scan the log of events based on one or more configuration files 234 (e.g., service configuration files and/or the like), which may include text files and/or the like. Additionally, or alternatively, the process flow 200 may include providing, using the proactive log scanner 232, event data to the event state decision engine 230 and determining, based on the event data, the event state of the batch processing. For example, the event state may be a running state (e.g., the batch processing is running), a hold state (e.g., the batch processing is in a hold), an error state (e.g., an error occurred in the batch processing), a completed state (e.g., the batch processing has been completed), an interactive mode state (e.g., the batch processing is awaiting user input), a stopped state (e.g., the batch processing has stopped), and/or the like.

In some embodiments, the process flow 200 may include determining, based on the event state, one or more actions to be taken with respect to the batch processing. As shown in FIG. 2, the event state decision engine 230 may access, receive, and/or store historical data from a knowledge base data structure 236 and may receive data and/or rules from a reasonableness and/or process checks service 238. In some embodiments, the historical data in the knowledge base data structure 236 may include historical data associated with event states of batch processing and actions taken with respect to batch processing. Additionally, or alternatively, the reasonableness and/or process checks service 238 may provide data and/or rules regarding actions taken with respect to batch processing, where the data and/or rules are determined by a user, an entity, a machine learning model, and/or the like.

In some embodiments, the process flow 200 may include determining, using the event state decision engine 230 and based on the event state, the historical data, and the data and/or rules from the reasonableness and/or process checks service 238, one or more actions to be taken with respect to the batch processing. For example, the event state decision engine 230 may determine, based on the event state being an error state, one or more actions (e.g., remedial actions) to be taken with respect to the batch processing, where the one or more actions include, but are not limited to, continuing the batch processing, launching another service and/or application, holding the batch processing, pausing the batch processing, stopping the batch processing, restarting the batch processing, skipping a batch run, a job, an action, and/or the like in the batch processing, fixing a batch run, a job, an action, and/or the like in the batch processing, escalating the event state to another service and/or application, notifying a user (e.g., a support user monitoring the batch processing and/or the like) regarding the error state, stopping a batch run, a job, an action, and/or the like in the batch processing, and/or the like.

In some embodiments, the process flow 200 may include determining one or more actions to be taken with respect to the batch processing using an event state decision machine learning model. For example, the process flow 200 may include providing, to the event state decision machine learning model, the event state and historical data associated with event states of batch processing and actions taken with respect to batch processing (e.g., from the knowledge base data structure 236) to determine the one or more actions to be taken with respect to the batch processing. In such an example, the process flow may include determining, based on the event state being an error state and using the event state decision machine learning model, one or more remedial actions to resolve the error state.

As shown in FIG. 2, the process flow 200 may include providing, using the event state decision engine 230, the one or more actions to be taken with respect to the batch processing to the process manager 208. In some embodiments, the process flow 200 may include relaying the one or more actions, from the event state decision engine 230, to one or more batch applications (e.g., in a manner similar to that described herein with respect to the process manager 208 relaying an action to a batch application 210). Additionally, or alternatively, the process flow 200 may include providing, using the event state decision engine 230, the event state to the process manager 208.

As shown in FIG. 2, the process flow 200 may include the process manager 208 communicating with an incident manager 240. In some embodiments, the process manager 208 may provide, to the incident manager 240 and based on receiving an error state from the event state decision engine 230, instructions to generate an incident management ticket 242.

As also shown in FIG. 2, the process flow 200 may include the process manager 208 communicating with a communications engine 244. In some embodiments, the process manager 208 may provide, to the communications engine 244 and based on the event state from the event state decision engine 230, instructions to generate, using a contact list data structure 246, a notification 248, where the notification 248 includes information based on the event state. Additionally, or alternatively, the communications engine 244 may generate, based on the generation of an incident management ticket 242, a notification 248. In some embodiments, the contact list data structure 246 may include contact information for a support user, a team of support users, and/or the like.

As shown in FIG. 2, the process flow 200 may include receiving, with the process manager 208, the incident management ticket and/or the notification. In some embodiments, the process flow 200 may include relaying, using the process manager 208, one or more actions, based on the incident management ticket and/or the notification, to one or more applications. For example, the process manager 208 may provide instructions, commands, and/or the like to cause one or more applications to provide information based on the incident management ticket and/or the notification to another system, another application, another platform, another user device, another user, and/or the like.

In some embodiments, the process manager 208 may communicate with the batch run planner 206, the batch applications (e.g., as described herein with respect to relaying an action to a batch application 210), the predictive engine 214, the event state decision engine 230, the incident manager 240, the communications engine 244, and/or the like via an application programming interface (API). Additionally, or alternatively, the predictive engine 214 may communicate with the process manager 208, the dependency rules engine 216, the event state decision engine 230, and/or the like via an API. In some embodiments, the event state decision engine 230 may communicate with the process manager 208, the predictive engine 214, the proactive log scanner 232, the reasonableness and/or process checks service 238, and/or the like via an API. By communicating via APIs, the system may be agnostic to applications and/or platforms used (e.g., developed internal to an entity, obtained from a third party, and/or the like) with the system.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for monitoring and automatically controlling batch processing within a technical environment, in accordance with an embodiment of the invention. In some embodiments, a batch process monitoring system and/or the like (e.g., similar to one or more of the systems described herein with respect to FIG. 1) may perform one or more of the steps of process flow 300.

As shown in block 302 of FIG. 3, the process flow 300 may include receiving a plurality of data processing requests and, for each data processing request, a calendar for the data processing request, one or more tasks to be completed for the data processing request, and requirements for the data processing request. For example, a batch process monitoring system may receive a plurality of data processing requests, calendars for the plurality of data processing requests, one or more tasks to be completed for the plurality of data processing requests, requirements for the plurality of data processing requests, and/or the like.

As shown in block 304, the process flow 300 may include determining a processing plan for the plurality of data processing requests, where the processing plan includes an order for performing the plurality of data processing requests and computing resources to be used to perform the plurality of data processing requests. For example, a batch process monitoring system may determine a processing plan for the plurality of data processing requests. In some embodiments, the process plan may include an order for performing the plurality of data processing requests, computing resources to be used to perform the plurality of data processing requests, and/or the like.

As shown in block 306, the process flow 300 may include providing, to one or more processing applications and based on the processing plan, actions for performance by the one or more processing applications to complete the plurality of data processing requests. For example, a batch process monitoring system may provide, to one or more processing applications and based on the processing plan, actions for performance by the one or more processing applications to complete the plurality of data processing requests.

As shown in block 308, the process flow 300 may include predicting, while the one or more processing applications are performing the actions, based on historical performances of data processing requests, and using a completion time predicting machine learning model, completion times for the plurality of data processing requests. For example, a batch process monitoring system may predict, while the one or more processing applications are performing the actions, based on historical performances of data processing requests, and using a completion time predicting machine learning model, completion times for the plurality of data processing requests.

As shown in block 310, the process flow 300 may include determining, while the one or more processing applications are performing the actions, whether the completion times satisfy the requirements for the plurality of data processing requests. For example, a batch process monitoring system may determine, while the one or more processing applications are performing the actions, whether the completion times satisfy the requirements for the plurality of data processing requests.

As shown in block 312, the process flow 300 may include allocating, based on the completion times not satisfying the requirements for the plurality of data processing requests, additional computing resources to the one or more processing applications. For example, a batch process monitoring system may allocate, based on the completion times not satisfying the requirements for the plurality of data processing requests, additional computing resources to the one or more processing applications.

As shown in block 314, the process flow 300 may include determining, while the one or more processing applications are performing the actions, a state of the plurality of data processing requests. For example, a batch process monitoring system may determine, while the one or more processing applications are performing the actions, a state of the plurality of data processing requests.

As shown in block 316, the process flow 300 may include determining, based on the state of the plurality of data processing requests corresponding to an error state and using an event state decision machine learning model, one or more remedial actions to resolve the error state. For example, a batch process monitoring system may determine, based on the state of the plurality of data processing requests corresponding to an error state and using an event state decision machine learning model, one or more remedial actions to resolve the error state.

As shown in block 318, the process flow 300 may include providing instructions to the one or more processing applications to perform the one or more remedial actions. For example, a batch process monitoring system may provide instructions to the one or more processing applications to perform the one or more remedial actions.

Process flow 300 may include additional embodiments, such as any single embodiment or any combination of embodiments described below and/or in connection with one or more other processes described elsewhere herein.

In a first embodiment, the process flow 300 may include, when determining the state of the plurality of data processing requests, scanning a log of events occurring while the one or more processing applications are performing the actions.

In a second embodiment alone or in combination with the first embodiment, the process flow 300 may include, when scanning the log of events, scanning the log of events based on one or more configured services.

In a third embodiment alone or in combination with any of the first through second embodiments, the process flow 300 may include determining, based on active runtime data of the one or more processing applications and server state data, a pace of the plurality of data processing requests.

In a fourth embodiment alone or in combination with any of the first through third embodiments, the process flow 300 may include, when determining the pace of the plurality of data processing requests, determining the pace of the plurality of data processing requests using a pace prediction machine learning model and based on the active runtime data of the one or more processing applications, the server state data, interdependencies of the plurality of data processing requests, and historical performances of data processing requests.

In a fifth embodiment alone or in combination with any of the first through fourth embodiments, the process flow 300 may include, while the one or more processing applications are performing the actions, monitoring the pace of the plurality of data processing requests to determine whether the pace of the plurality of data processing requests decreases, predicting, based on determining that the pace of the plurality of data processing requests is decreasing and using the completion time predicting machine learning model, updated completion times for the plurality of data processing requests, determining whether the updated completion times satisfy the requirements for the plurality of data processing requests, and allocating, based on the updated completion times not satisfying the requirements for the plurality of data processing requests, supplementary computing resources to the one or more processing applications.

In a sixth embodiment alone or in combination with any of the first through fifth embodiments, the process flow 300 may include, when predicting the completion times, predicting the completion times based on active runtime data of the one or more processing applications.

In a seventh embodiment alone or in combination with any of the first through sixth embodiments, the process flow 300 may include, when predicting the completion times, determining, based on dependency rules, interdependencies of the plurality of data processing requests and predicting the completion times based on the interdependencies.

In an eighth embodiment alone or in combination with any of the first through seventh embodiments, the process flow 300 may include generating, based on the state of the plurality of data processing requests corresponding to the error state, an incident management ticket In a ninth embodiment alone or in combination with any of the first through eighth embodiments, the process flow 300 may include determining, based on generating the incident management ticket and based on the state of the plurality of data processing requests, whether the one or more remedial actions performed by the one or more processing applications resolved the error state and providing, to a support user and based on determining that the one or more processing applications did not resolve the error state, a notification regarding the incident management ticket.

In a tenth embodiment alone or in combination with any of the first through ninth embodiments, the one or more remedial actions to resolve the error state may include continuing performing the actions to complete the plurality of data processing requests, restarting performance of the actions to complete the plurality of data processing requests, pausing, for a time period, performance of the actions to complete the plurality of data processing requests and resuming, after the time period, the performance of the actions to complete the plurality of data processing requests, skipping performance of one or more of the actions to complete the plurality of data processing requests, fixing performance of the actions to complete the plurality of data processing requests, escalating, to a support user, the plurality of data processing requests, stopping performance of the actions to complete the plurality of data processing requests, and/or the like.

In an eleventh embodiment alone or in combination with any of the first through tenth embodiments, the process flow 300 may include providing the actions to complete the plurality of data processing requests to the one or more processing applications via an application programming interface.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As noted above, in some embodiments, the process flow 200 and/or the process flow 300 may include performing one or more of the functions described herein using machine learning and/or a machine learning model. For example, the system may provide data associated with data processing requests, batch processing runs, batch jobs, and/or the like, data associated with interdependencies of tasks, actions, jobs, processes, and/or the like, to a completion time predicting machine learning model trained (e.g., using historical data associated with data processing requests, batch processing runs, batch jobs, and/or the like, historical data associated with completion times, and/or the like) to output estimated completion times of data processing requests, batch processing runs, batch jobs, and/or the like. As another example, the system may provide data associated with data processing requests, batch processing runs, batch jobs, and/or the like, data associated with interdependencies of tasks, actions, jobs, processes, and/or the like to a pace prediction machine learning model trained (e.g., using historical data associated with data processing requests, batch processing runs, batch jobs, and/or the like, historical data associated with paces, and/or the like) to output predicted paces of data processing requests, batch processing runs, batch jobs, and/or the like. As yet another example, the system may provide data associated with data processing requests, batch processing runs, batch jobs, and/or the like, data associated with interdependencies of tasks, actions, jobs, processes, and/or the like, data associated with event states of batch processing, data associated with actions taken with respect to batch processing, and/or the like to an event state decision machine learning model trained (e.g., using historical data associated with data processing requests, batch processing runs, batch jobs, and/or the like, historical data associated with interdependencies of tasks, actions, jobs, processes, and/or the like, historical data associated with event states of batch processing, historical data associated with actions taken with respect to batch processing, historical data associated with outcomes of batch processing after actions are taken with respect to the batch processing, and/or the like) to output actions to be taken with respect to batch processing.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, a linear discriminant analysis, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on data over a predetermined past period of time. In doing so, the system may be configured to output completion times, paces of batch processing, actions to be taken, and/or the like. In some embodiments, the one or more machine learning algorithms may be used to calculate likelihoods of a batch processing being corrected by an action, and whether the likelihood satisfies a threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C#, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for monitoring and automatically controlling batch processing, the system comprising:
at least one non-transitory storage device; and
at least one processing device coupled to the at least one non-transitory storage device, wherein the at least one processing device is configured to:
receive a plurality of data processing requests and, for each data processing request, a calendar for the data processing request, one or more tasks to be completed for the data processing request, and requirements for the data processing request;
determine a processing plan for the plurality of data processing requests, wherein the processing plan comprises an order for performing the plurality of data processing requests and computing resources to be used to perform the plurality of data processing requests;
provide, to one or more processing applications and based on the processing plan, actions for performance by the one or more processing applications to complete the plurality of data processing requests;
predict, while the one or more processing applications are performing the actions, based on historical performances of data processing requests, and using a completion time predicting machine learning model, completion times for the plurality of data processing requests;
determine, while the one or more processing applications are performing the actions, whether the completion times satisfy the requirements for the plurality of data processing requests; and allocate, based on the completion times not satisfying the requirements for the plurality of data processing requests, additional computing resources to the one or more processing applications.

2. The system of claim 1, wherein the at least one processing device is further configured to determine, based on active runtime data of the one or more processing applications and server state data, a pace of the plurality of data processing requests.

3. The system of claim 2, wherein the at least one processing device is further configured to, when determining the pace of the plurality of data processing requests, determine the pace of the plurality of data processing requests using a pace prediction machine learning model and based on the active runtime data of the one or more processing applications, the server state data, interdependencies of the plurality of data processing requests, and historical performances of data processing requests.

4. The system of claim 2, wherein the at least one processing device is further configured to, while the one or more processing applications are performing the actions:
monitor the pace of the plurality of data processing requests to determine whether the pace of the plurality of data processing requests decreases;
predict, based on determining that the pace of the plurality of data processing requests is decreasing and using the completion time predicting machine learning model, updated completion times for the plurality of data processing requests;
determine whether the updated completion times satisfy the requirements for the plurality of data processing requests; and
allocate, based on the updated completion times not satisfying the requirements for the plurality of data processing requests, supplementary computing resources to the one or more processing applications.

5. The system of claim 1, wherein the at least one processing device is further configured to, when predicting the completion times, predict the completion times based on active runtime data of the one or more processing applications.

6. The system of claim 1, wherein the at least one processing device is further configured to, when predicting the completion times:
determine, based on dependency rules, interdependencies of the plurality of data processing requests; and
predict the completion times based on the interdependencies.

7. The system of claim 1, wherein the at least one processing device is further configured to provide the actions to complete the plurality of data processing requests to the one or more processing applications via an application programming interface.

8. A computer program product for monitoring and automatically controlling batch processing, the computer program product comprising a non-transitory computer-readable medium comprising code causing a first apparatus to:
receive a plurality of data processing requests and, for each data processing request, a calendar for the data processing request, one or more tasks to be completed for the data processing request, and requirements for the data processing request;
determine a processing plan for the plurality of data processing requests, wherein the processing plan comprises an order for performing the plurality of data processing requests and computing resources to be used to perform the plurality of data processing requests;
provide, to one or more processing applications and based on the processing plan, actions for performance by the one or more processing applications to complete the plurality of data processing requests;
predict, while the one or more processing applications are performing the actions, based on historical performances of data processing requests, and using a completion time predicting machine learning model, completion times for the plurality of data processing requests;
determine, while the one or more processing applications are performing the actions, whether the completion times satisfy the requirements for the plurality of data processing requests; and
allocate, based on the completion times not satisfying the requirements for the plurality of data processing requests, additional computing resources to the one or more processing applications.

9. The computer program product of claim 8, wherein the non-transitory computer-readable medium comprises code causing the first apparatus to determine, based on active runtime data of the one or more processing applications and server state data, a pace of the plurality of data processing requests.

10. The computer program product of claim 9, wherein the non-transitory computer-readable medium comprises code causing the first apparatus to, when determining the pace of the plurality of data processing requests, determine the pace of the plurality of data processing requests using a pace prediction machine learning model and based on the active runtime data of the one or more processing applications, the server state data, interdependencies of the plurality of data processing requests, and historical performances of data processing requests.

11. The computer program product of claim 9, wherein the non-transitory computer-readable medium comprises code causing the first apparatus to, while the one or more processing applications are performing the actions:
monitor the pace of the plurality of data processing requests to determine whether the pace of the plurality of data processing requests decreases;
predict, based on determining that the pace of the plurality of data processing requests is decreasing and using the completion time predicting machine learning model, updated completion times for the plurality of data processing requests;
determine whether the updated completion times satisfy the requirements for the plurality of data processing requests; and
allocate, based on the updated completion times not satisfying the requirements for the plurality of data processing requests, supplementary computing resources to the one or more processing applications.

12. The computer program product of claim 8, wherein the non-transitory computer-readable medium comprises code causing the first apparatus to, when predicting the completion times, predict the completion times based on active runtime data of the one or more processing applications.

13. The computer program product of claim 8, wherein the non-transitory computer-readable medium comprises code causing the first apparatus to, when predicting the completion times:
determine, based on dependency rules, interdependencies of the plurality of data processing requests; and
predict the completion times based on the interdependencies.

14. The computer program product of claim 8, wherein the non-transitory computer-readable medium comprises code causing the first apparatus to provide the actions to complete the plurality of data processing requests to the one or more processing applications via an application programming interface.

15. A method for monitoring and automatically controlling batch processing, the method comprising:
- receiving a plurality of data processing requests and, for each data processing request, a calendar for the data processing request, one or more tasks to be completed for the data processing request, and requirements for the data processing request;
- determining a processing plan for the plurality of data processing requests, wherein the processing plan comprises an order for performing the plurality of data processing requests and computing resources to be used to perform the plurality of data processing requests;
- providing, to one or more processing applications and based on the processing plan, actions for performance by the one or more processing applications to complete the plurality of data processing requests;
- predicting, while the one or more processing applications are performing the actions, based on historical performances of data processing requests, and using a completion time predicting machine learning model, completion times for the plurality of data processing requests;
- determining, while the one or more processing applications are performing the actions, whether the completion times satisfy the requirements for the plurality of data processing requests; and
- allocating, based on the completion times not satisfying the requirements for the plurality of data processing requests, additional computing resources to the one or more processing applications.

16. The method of claim 15, comprising determining, based on active runtime data of the one or more processing applications and server state data, a pace of the plurality of data processing requests.

17. The method of claim 16, comprising, when determining the pace of the plurality of data processing requests, determining the pace of the plurality of data processing requests using a pace prediction machine learning model and based on the active runtime data of the one or more processing applications, the server state data, interdependencies of the plurality of data processing requests, and historical performances of data processing requests.

18. The method of claim 16, comprising, while the one or more processing applications are performing the actions:
- monitoring the pace of the plurality of data processing requests to determine whether the pace of the plurality of data processing requests decreases;
- predicting, based on determining that the pace of the plurality of data processing requests is decreasing and using the completion time predicting machine learning model, updated completion times for the plurality of data processing requests;
- determining whether the updated completion times satisfy the requirements for the plurality of data processing requests; and
- allocating, based on the updated completion times not satisfying the requirements for the plurality of data processing requests, supplementary computing resources to the one or more processing applications.

19. The method of claim 15, comprising, when predicting the completion times, predicting the completion times based on active runtime data of the one or more processing applications.

20. The method of claim 15, comprising, when predicting the completion times:
- determining, based on dependency rules, interdependencies of the plurality of data processing requests; and
- predicting the completion times based on the interdependencies.

\* \* \* \* \*